United States Patent Office 2,934,518
Patented Apr. 26, 1960

2,934,518
POLY(ETHYLENE OXIDE) STABILIZED WITH PROPYL GALLATE

Keith L. Smith, Charleston, W. Va., assignor to Union Carbide Corporation, a corporation of New York No Drawing. Application June 20, 1956
Serial No. 592,514

2 Claims. (Cl. 260—45.85)

The present invention relates to stabilizers for use with epoxide ethylene oxide polymers. More particularly, this invention is concerned with stabilized compositions of ethylene oxide polymers in which degradation in molecular weight and viscosity loss is substantially prevented, and to a method of making the same.

Ethylene oxide homopolymers having a reduced viscosity of at least 1.0 can be prepared by a variety of processes employing a number of different catalysts, such as, for example, the alkaline earth metal derivatives of organic hydroxyl compounds (i.e. strontium methylate, calcium derivative of ethylene glycol) and certain pure metal carbonates which preferably contain about 0.1 percent sorbed water by weight of the carbonate (i.e. strontium and zinc carbonate).

For example, fifteen hundredths of a gram of zinc amide polymerized thirty grams of ethylene oxide in a sealed tube at 90° C. In twenty-four hours a quantitative yield of polymer of reduced viscosity 3.6 was obtained. Room temperature polymerization of ethylene oxide with 0.1 percent calcium amide catalyst gave a twenty percent conversion to polymer of reduced viscosity 61 in five days.

The homopolymers are also useful as thickeners, and binders, as well as plasticizers in adhesive compositions. The polymers with viscosities greater than 30 are particularly useful as thickeners, small concentrations giving viscous solutions. The polymers are also useful for the production of films and various molded articles.

The present invention also envisages stabilized compositions containing copolymers of ethylene oxide having a reduced viscosity of at least 0.5. These copolymers can have modified solution properties. For instance, ethylene oxide homopolymers are water soluble. By increasing the content of comonomer, the solution properties can be continuously varied from water soluble to water insoluble polymers. These copolymers are particularly useful in the formation of films cast from solutions of the copolymers dissolved in a variety of solvents such as water and acetonitrile. They are also useful in the preparation of shaped articles employing molding and extruding techniques. The mechanical properties can also be modified. Increasing comonomer content reduces the stiffness and tensile strength of the polymers. Resins covering a spectrum of mechanical properties are obtained with characteristics that better fit them to various applications.

These polymers, regardless of the process or catalyst employed in preparation, are susceptible to degradation in molecular weight. Such degradation increases with the molecular weight of the polymer, the length of aging, and increasing temperatures.

Thus the usefulness of ethylene oxide polymers in many of their applications is greatly enhanced by obtaining and maintaining a relatively high molecular weight therein.

The solid copolymers employed herein can contain one or more of the lower olefin oxides with ethylene oxide. Examples of such monomers are propylene oxide, 1,2-epoxybutane, 2,3-epoxybutane, and isobutylene oxide, or styrene oxide.

The polymers, such as those previously described can be produced by polymerizing a mixture of ethylene oxide and the before-named monomer or monomers, as the case may be, in the presence of a polymerization catalyst such as one of those disclosed in the application of F. N. Hill, and F. E. Bailey, Jr., Serial No. 587,933, entitled "Polymerization of Epoxides," and filed May 29, 1956, now abandoned, and in the application of F. N. Hill, J. T. Fitzpatrick and F. E. Bailey, Jr., Serial No. 587,954, entitled "Process for the Polymerization of Epoxides Using Alkaline Earth Metal Derivatives of Organic Hydroxy Compounds and New Compounds Obtained Thereby," and filed May 29, 1956, now abandoned. The catalysts disclosed in the first of these two applications are certain divalent metal carbonates which are free of ions which interfere with the polymerization and which preferably contain at least about 0.01 percent, most preferably at least about 1.0 percent, by weight of the catalyst, of sorbed water and, preferably, are substantially free of non-sorbed water.

These divalent metal carbonates are the carbonates of metals having atomic numbers greater than 11 and less than 57 and appearing below potassium and above tin in the "Electromotive Series of the Elements" as shown in Handbook of Chemistry and Physics, 30th ed. (1948), Chemical Rubber Publishing Company. These metals include Mg, Ca, Sr, Ba, Zn, Cd, Fe, Co, Ni, Cr and Mn. The preferred catalysts are the carbonates of the metals found in group II of the periodic table, especially those found in group IIA, and manganous carbonate.

The loss in molecular weight of poly(ethylene oxide) which is not protected against degradation can, under many use conditions, be so serious as to change the physical character of the material, for example, poly(ethylene oxide) homopolymer, from a tough strong resin to a much less useful brittle wax. Further, stabilization of poly(ethylene oxide) as well as the copolymers thereof becomes progressively more difficult with the higher molecular weight grades of resin. Prior methods and the materials for stabilizing ethylene oxide polymers of reduced viscosities substantially below one are, almost without exception, ineffective when used with a higher molecular weight grade.

The problem is further made difficult by the variety of exposures to which the poly(ethylene oxide) resin and modified copolymers thereof as described above may be put under practical operating conditions. These conditions will require, for example, that relatively dilute solutions of resin in water maintain their viscosity over relatively long periods of time, that solution and resin hot-melt retain their molecular weight upon exposure to high temperature, and that the resin be substantially free from degradation when subjected to thermoplastic processing operations. The problem is further complicated by the possibility that the degradation of ethylene oxide homopolymers may be caused by any one or a combination of several means, among them being the hydrolysis and oxidation of segments of the polymer chain.

Buffering of solutions of these polymers to maintain a low hydrogen ion concentration lessens degradation of the resin. While this may be useful under certain circumstances, in many applications a high pH is undesirable, and adequate buffering action to maintain a rather high pH will, in many instances, involve high concentrations of salt, which in itself will prove inexpedient. Further, difficulty will often occur in stabilizing dry resin by this process.

According to the present invention it has been found that small amounts of propyl gallate incorporated into ethylene oxide polymers having a reduced viscosity of at least 0.5, and solutions and suspensions thereof, and wherein preferably the homopolymers have a reduced viscosity of at least 1.0 and the copolymers of ethylene oxide have a reduced viscosity of at least 0.5, provide a composition that is stabilized against degradation which otherwise would result on exposure of the resins to moisture, heat, relatively high hydrogen ion concentrations, oxygen and various combinations of these factors.

Poly(ethylene oxide) resin containing propyl gallate as a stabilizer therefor further provides stabilization of the resin without substantial alteration in its physical properties as, for example, without discoloration or aging on exposure to heat and light, while at the same time the stabilizer itself is stable and non-toxic, and will neither be easily extracted from the resin into which it has been incorporated nor will it contribute to the opacity of the latter. Solutions made from poly(ethylene oxide) resin stabilized with propyl gallate will discolor in the presence of iron or its salts. This can be corrected, however, by use of a suitable sequestering agent, such as ethylenediamine tetraacetic acid. The inclusion of about 0.5 percent of this material by weight of the resin present is sufficient to prevent substantial discoloration in most instances. Higher amounts can be used where the exposures to iron are most severe.

It has been found that there is an optimum range of concentration of the stabilizer of this invention, when incorporated into the ethylene oxide resins described herein. An amount of stabilizer which is at least 0.3 part to 0.6 part per 100 parts of poly(ethylene oxide) by weight thereof is preferred. Below 0.3 part the stabilization is not as effective and above 0.6 part no concomitant advantage is obtained with the increased concentration although larger amounts can be used.

The solid ethylene oxide polymers preferred have a reduced viscosity of 1.0 or higher and a melting point of 65±2° C., that is a no strength temperature, as determined by stiffness-temperature measurements.

These measurements were arrived at in the following manner. The force required to stretch a 0.250″ x 0.010″ x 2.0″ sample of poly(ethylene oxide), one percent (0.02″) was measured over a temperature range from −60° C. to +20° C. in 10° C. increments and from 20° C. to 65° C. in 5° C. increments. This polymer showed an abrupt drop off in stiffness between 60° C. and 65° C.—7200 p.s.i to 400 p.s.i. in this range.

As the term is used throughout this specification, reduced viscosity of a polymer is regarded as a measure of its molecular weight. The reduced viscosity of a solution of a polymer at a given temperature is obtained by dividing the specific viscosity by the concentration of the polymer in the solution measured in grams of polymer per hundred milliliters of the solvent. The specific viscosity is obtained by dividing the difference between the viscosity of the solution and the viscosity of the pure solvent by the viscosity of the solvent. The reduced viscosities of the ethylene oxide polymers referred to herein were measured at 30° C. in acetonitrile at a concentration of 0.2 gram per hundred milliliters of solvent.

The method by which this stabilizer is incorporated into the ethylene oxide resins is not critical, and any of a variety of means of insuring thorough incorporation may be used. One of the most efficient of these involves admixture of the stabilizer with the resin at the time the latter is formed. Another method advantageously employed comprises introducing the stabilizer into a resin suspension, and bringing the stabilizer into intimate contact with the dispersed polymer by evaporating off the diluent. Suitable non-solvent diluents are, for example, saturated aliphatic ethers, ketones, saturated aliphatic hydrocarbons, higher molecular weight saturated alcohols and saturated aliphatic esters (i.e. dibutyl ether, diethyl ether, dioxane, acetone, methyl ethyl ketone, hexane, cyclohexane, heptane, butanol, ethyl acetate). Other methods include mixing the stabilizer with the molten resin; dissolving the stabilizer in resin solutions employing solvent diluents therefor, for example, methanol, acetic acid, benzene and water (e.g. dilute aqueous solutions) preferably 5 percent solution in dimethyl formamide or acetonitrile; or incorporation on a two-roll mill, extruder, Banbury mixer, or similar device. The stabilizer is effective in diluents regardless of the concentration of polymer.

The propyl gallate may not, however, be incorporated into the polymerizing mixture used for manufacturing polyethylene oxide until polymerization is substantially complete, since propyl gallate inhibits polymerization or is itself rendered ineffective as a stabilizer by the polymerization process.

The following examples are illustrative of the invention.

EXAMPLE 1

Samples of unstabilized poly(ethylene oxide) resin were dissolved in acetonitrile, together with the stabilizer to be tested, as listed in Table I. The amount of stabilizer added, based on the weight of polyethylene oxide resin in the acetonitrile solution, is as shown in Table I. When the resin and stabilizer were dissolved the solution was placed in a vacuum desiccator and evaporated to dryness under high vacuum. The dry resin was then cut into many small pieces, and two random samples taken from the resin for testing purposes. One sample was dissolved in water to form a 0.2 percent solution, and the reduced viscosity determined. This is reported in Table I as initial reduced viscosity (water). The other random sample of dry resin was aged in a forced-circulation oven for 20 minutes at 150° C.±4° C. This sample was then removed from the oven and dissolved in water to make a 0.2 percent aqueous solution as in the case of the initial determination. The percent loss in reduced viscosity on aging was then calculated as that percent of the initial reduced viscosity which was lost as the result of the aging treatment. Results are shown in Table I.

*Table I*

STABILIZING EFFECT OF DIFFERENT MATERIALS WHEN INCORPORATED INTO POLY(ETHYLENE OXIDE) RESIN SUBJECTED TO DRY HEAT EXPOSURE

| Stabilizer Used | Concentration of Stabilizer in Resin | Initial Reduced Viscosity (Water) | Reduced Viscosity after aging 20 minutes at 150° C. | Percent Loss in Reduced Viscosity |
|---|---|---|---|---|
| None | 0.0 | 9.35 | 1.80 | 80.8 |
| 4-tertiary Butyl-2-Phenylphenol | 0.5 | 8.55 | 1.30 | 84.8 |
| ortho-alpha Phenylphenol | 0.5 | 8.80 | 1.25 | 85.8 |
| para alpha Cumylphenol | 0.5 | 7.85 | 1.40 | 82.2 |
| 4(alpha-Methylbenzyl)-2-Phenylphenol | 0.5 | 8.05 | 1.25 | 84.5 |
| para alpha Phenethylphenol | 0.5 | 8.85 | 1.80 | 79.7 |
| p,p'-Isopropylidene diphenol | 0.5 | 7.95 | 1.65 | 79.3 |
| para-(2,4-Dinitroanilino)phenol | 0.5 | 6.85 | 2.65 | 61.3 |
| N-phenyl-para-Phenylenediamine | 0.5 | 9.60 | 4.85 | 49.5 |
| Phenyl-1-Naphthylamine | 0.5 | 10.20 | 5.55 | 45.6 |
| N-Phenyl-alpha Naphthylamine | 0.5 | 8.00 | 3.80 | 52.5 |
| 2,6-bis-tertiary-butyl-4-methylphenol | 0.5 | 6.15 | 1.30 | 73.0 |
| Phenethyl Resorcinol | 0.5 | 6.15 | 1.75 | 70.6 |
| Ethyl Gallate | 0.5 | 8.40 | 3.95 | 53.0 |
| n-Propyl Gallate | 0.5 | 8.68 | 5.90 | 32.0 |

EXAMPLE 2

Resins containing different potential stabilizers for poly(ethylene oxide) resin were prepared in a manner similar to that of Example 1 above. After the resin was dried in the vacuum desiccator, it was cut up as before and a portion of it dissolved in water to form a 0.2 percent aqueous solution. The initial reduced viscosity of this solution was determined. Then the solution was placed in a 150 milliliter Erlenmeyer glass-stoppered flask and the air space above the solution in the bottle purged with oxygen. The bottles were then placed in a forced convection oven and aged for one week at 70° C. ±3° C. At the end of this time the reduced viscosity of the 0.2 percent aqueous solution was again determined. The percent loss in reduced viscosity was calculated as in Example 1 and is reported in Table II.

*Table II*

STABILIZING EFFECT OF DIFFERENT MATERIALS WHEN INCORPORATED INTO POLY(ETHYLENE OXIDE) RESIN SUBJECTED TO HEAT EXPOSURE IN 0.2 PERCENT WATER SOLUTION

| Stabilizer Used | Concentration of Stabilizer in Resin | Initial Reduced Viscosity (Water) | Reduced Viscosity after aging 7 days at 70° C. | Percent Loss in Reduced Viscosity |
|---|---|---|---|---|
| None | 0.0 | 6.70 | 0.04 | 99.4 |
| para-Hydroxydiphenylamine | 0.5 | 8.22 | 2.40 | 70.8 |
| N,N'-di-beta-Naphthyl-para-phenylenediamine | 0.5 | 9.63 | 0.19 | 98.0 |
| n-Propyl gallate | 0.5 | 8.09 | 4.28 | 47.1 |
| 2,6-Ditertiary Butyl para cresol | 0.5 | 8.49 | 2.82 | 66.8 |
| Phenyl alpha-Naphthylamine | 0.5 | 8.55 | 0.10 | 98.8 |
| Ethyl gallate | 0.5 | 8.10 | 0.10 | 98.8 |

SSN,N-'di-beta-Naphthɛl-para-phenɛl-

I claim:

1. A composition comprising poly(ethylene oxide) which has a reduced viscosity value of at least 1.0 as determined at a concentration of 0.2 gram of said poly(ethylene oxide) in 100 milliliters of acetonitrile at 30° C., and at least 0.3 part by weight of propyl gallate per 100 parts by weight of said poly(ethylene oxide).

2. A composition comprising poly(ethylene oxide) which has a reduced viscosity value of at least 1.0 as determined at a concentration of 0.2 gram of said poly(ethylene oxide) in 100 milliliters of acetonitrile at 30° C., and a stabilizing amount of propyl gallate.

References Cited in the file of this patent

UNITED STATES PATENTS

| | | |
|---|---|---|
| 2,255,191 | Sabalitschka et al. | Sept. 9, 1941 |
| 2,432,517 | Dreyfus et al. | Dec. 16, 1947 |
| 2,641,614 | Britton et al. | June 9, 1953 |
| 2,722,492 | Ralston | Nov. 1, 1955 |
| 2,722,493 | Markwood et al. | Nov. 1, 1955 |
| 2,758,931 | Hall | Aug. 14, 1956 |

FOREIGN PATENTS

| | | |
|---|---|---|
| 618,839 | Great Britain | Feb. 28, 1949 |

OTHER REFERENCES

Black et al.: Modern Plastics, December 1954, pages 139, 140, 142, 147 and 237.